Nov. 5, 1968　　　　J. B. MONEY　　　　3,409,796

CATHODE RAY TUBE MICROFILM INDEXING SYSTEM

Filed Oct. 14, 1964

INVENTOR.
JAMES B. MONEY

BY *John L Jackson*

ATTORNEY

United States Patent Office 3,409,796
Patented Nov. 5, 1968

3,409,796
CATHODE RAY TUBE MICROFILM
INDEXING SYSTEM
James B. Money, San Jose, Calif., assignor to International Business Machines Corporation, Armonk, N.Y., a corporation of New York
Filed Oct. 14, 1964, Ser. No. 403,862
6 Claims. (Cl. 315—10)

ABSTRACT OF THE DISCLOSURE

A selected frame on a length of non-sprocketed microfilm is moved into approximate alignment with an optical station. The two edges of the border are swept by a cathode ray tube spot. A photomultiplier converts the modulated light from the edges of the border into a voltage. A pulse is generated at the midpoint of the horizontal sweep of the cathode ray tube. The falling edge of the initial photomultiplier output is used to set a trigger to a plus state. The trigger is reset by the center pulse of the CRT sweep. The center pulse also sets another trigger to a minus state of equal amplitude and this trigger is reset by the leading edge of the second photomultiplier output. Both trigger outputs are fed into an integrating circuit. The value of the integral is representative of positional error with respect to the center of the cathode ray tube. An associated servo motor is then operated to null this error.

---

This invention relates to the indexing of individual frames of microfilm in general and more particularly to the indexing of individual frames of non-sprocketed microfilm which does not necessarily have the typical Mil D type indexing mark associated with each frame.

With the recent advent of image storage and retrieval systems, the indexing of microfilm reels or strips has become quite important. In the past, indexing of microfilm has not been critical since the uses usually made were for purposes of viewing in which case the operator had at his disposal a centering or positioning means such that desired microfilm frames could be centered in the viewing screen for viewing and subsequent printout, if desired. However, with the trend in microimage storage systems toward storage on discrete unit record type strips of film, the necessity has arisen for highly accurate indexing systems for use in indexing non-sprocketed microfilm for copy onto the discrete unit record type storage media.

Typical approaches toward the indexing of non-sprocketed microfilm have followed the approach used in positioning sprocketed microfilm, i.e., control of the driving capstan or, as in the case of sprocketed microfilm, control of the sprocket. Obviously however, certain problems are present when control of movement of microfilm is attempted by exercise of control over capstan movement. Thus, for instance, any slippage between the capstans and the length of film results in positioning error. While the amount of slippage may be small, it is often intolerable due to the large reduction ratios emploped in microfilm systems.

Another approach taken, which works ideally in those systems wherein Mil D type microfilm is utilized, is the subject of U.S. Patent No. 3,248,029, entitled "Non-Sprocketed Microfilm Stepping Device" by the same inventor and assigned to the assignee of the subject invention. As will be noted however, this invention is for use in Mil D type microfilm systems and utilizes the Mil D index mark for centering purposes. Thus, since the majority of the microfilm records currently in existence are non-Mil D type, this type of system is limited in its application.

It is therefore an object of the present invention to provide a novel microfilm indexing system for use in indexing non-sprocketed microfilm.

It is another object of the present invention to provide a new microfilm indexing system which can be utilized with both Mil D and non-Mil D type microfilm systems.

It is another object of the present invention to provide a new microfilm indexing system for use in a non-sprocketed microfilm environment where positioning accuracies are determined not by the rotational position of the driving member, such as a capstan, but by reference to the frames of the microfilm itself.

Other and further objects and advantages of the invention will be apparent from the following more particular description of the preferred embodiment of the invention as illustrated in the accompanying drawings in which.

Briefly, in the preferred embodiment, a selected frame on a length of non-sprocketed microfilm is moved into approximate alignment with an optical station. The two edges of the border are swept by a cathode ray tube spot. A photomultiplier converts the modulated light from the edges of the border into a voltage. A pulse is generated at the midpoint of the horizontal sweep of the cathode ray tube. The falling edge of the initial photomultiplier output is used to set a trigger to a plus state. The trigger is reset by the center pulse of the CRT sweep. The center pulse also sets another trigger to a minus state of equal amplitude and this trigger is reset by the leading edge of the second photomultiplier output. Both trigger outputs are fed into an integrating circuit. The value of the integral is representative of positional error with respect to the center of the cathode ray tube. An associated servo motor is then operated to null this error.

Figure 1:
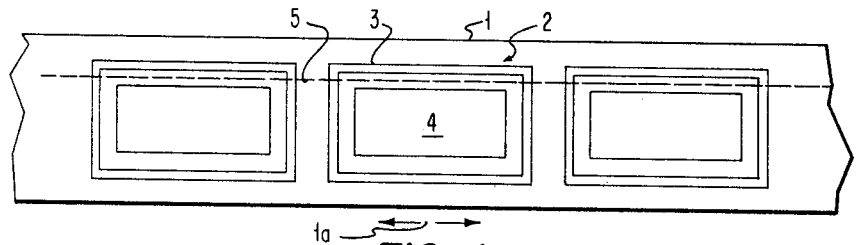
FIG. 1 is a view illustrating the conventional location of frames on a length of non-sprocketed microfilm.

For a more detailed description of the novel system of the subject application, refer first to FIG. 1 wherein is shown a length of microfilm which may be a portion of a reel of microfilm. The microfilm of FIG. 1 is in conventional form and on the length of film 1 are shown a number of frames 2 each being outlined by an opaque border 3. Contained within the opaque border 3 is an image area 4 which is separated from the opaque border 3 by a transparent area 4a.

As shown in FIG. 1, the length of film 1 is movable in the direction illustrated by arrow 1a by means of capstans in a conventional manner. These capstans are in turn driven by a servo motor 45 shown in block form in FIG 3. The particular configuration of the servo motor will hereinafter be more fully discussed.

Shown in FIG. 1 is a dotted line 5 which illustrates the position of the path of the sweep of the cathode ray tube spot which is used for centering a selected frame 2. In FIG. 1 it will be observed that each of the frames includes the opaque edge 3. As previously stated, these opaque edges 3 are used for position control in the hereinafter described positioning system. The image 4 is always positioned relative to the inside edges of the opaque edge 3. In fact, the National Microfilm Association specifications on the image 4 are referenced to the opaque edges 3. Thus, accurate control over the image 4 can be accomplished by accurate positioning of the opaque border 3.

Figure 2:
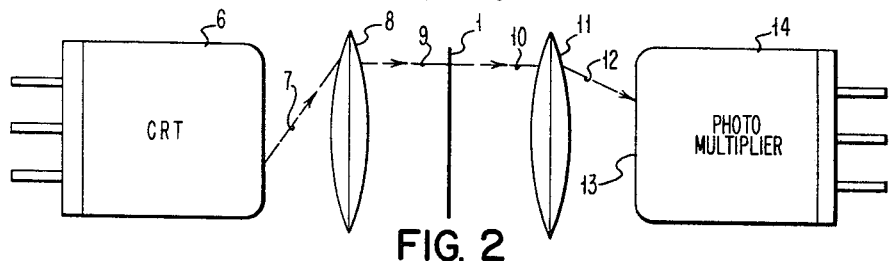
FIG. 2 is a representation of the cathode ray tube-photocell configuration utilized to scan a length of microfilm of the type as illustrated in FIG. 1.

Refer next to FIG. 2. A cathode ray tube 6 emits light from its spot as indicated by arrow 7 which is focused by lens 8. The light from lens 8 moves along a path indicated by arrow 9 through the film 1 at a point corresponding to the path 5 of FIG. 1. The light modulated by the borders of the frames of the microfilm then passes, as indicated by arrow 10, through a condensing lens 11, thence along a line as indicated by arrow 12 onto the face 13 of a photocell or photomultiplier 14. This diagrammatic representation in FIG. 2 is merely for illustrating one way of positioning the cathode ray tube, film, lenses and photocell of the subject system. It will, of course be recognized that other ways of imaging the cathode ray tube spot onto the film and detecting this as a photocell are possible. That is, in certain applications it will be possible to go directly from the cathode ray tube through the film and onto the photocell without any intermediate focusing or condensing lens.

In a system actually built, the cathode ray tube phosphor utilized had a short to medium short persistence with a peak wave length of light at 4600 Angstrom units. This particular phosphor was chosen such that it would be capable of utilization in both diazo and silver film systems. Additionally, the light emitted from the phosphor of the CRT was focused at the 35 mm. film plane to a 10 mil spot size.

With respect to the cathode ray tube, only the horizontal sweep is used. The sweep, of course, must exceed one frame width. In the system actually built, a 1.5 frame width was employed. As shown in FIG. 1, the point of the sweep must be along a line 5 which is free of the image area 4, but which crosses the opaque border 3 to provide, as will hereinafter become more apparent, control pulses for the positioning system.

Figure 3:
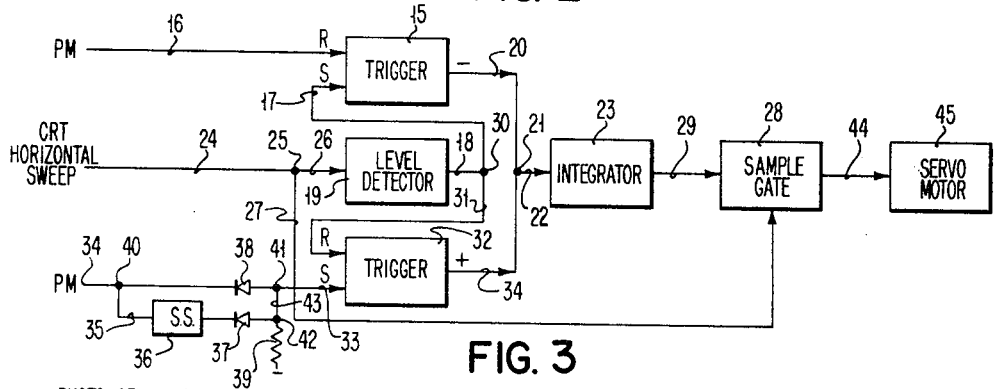
FIG. 3 is a block schematic diagram of the electrical control system utilized to provide a position error feedback for use by a servo motor connected to the driving capstan which drives a length of microfilm to be indexed.

Refer next to FIG. 3 wherein is shown the control circuits for the subject positioning system. In FIG. 3 is shown a trigger 15 having its reset input connected along line 16 to the photomultiplier and having its set terminal connected along line 17 to a junction 30, which in turn is connected to the output line 18 of a level detector 19. The trigger 15 has its output connected along line 20 to a junction 21, which is connected along line 22 to an integrator 23. As indicated in FIG. 3, the output of the trigger 15 is negative when the trigger is set.

Line 24 is connected to the cathode ray tube horizontal sweep and is also connected to junction 25. Junction 25 in turn is connected along line 26 to the input of the level detector 19 and is also connected along line 27 to the sample gate 28. Another input to the sample gate 28 is along line 29 from the output portion of the integrator 23.

Junction 30, which is connected to the output portion of the level detector 19 by means of line 18, is also connected along line 31 to the reset terminal of another trigger 32. The set terminal of trigger 32 is connected by means of line 33 through a diode 38 to the photomultiplier by means of line 34. Line 34 is connected to junction 40 which is connected both to the cathode of diode 38 and to line 35, which in turn is connected to the input of a single shot 36. The anode of diode 38 is connected to junction 41, which in turn is connected to the line 33. The output of the single shot 36 is connected to the cathode of a diode 37, the anode of which is connected to junction 42, which is connected both to junction 41 by means of line 43 and through a resistor 39 to a negative supply. It will, of course, be obvious to those skilled in the art that diodes 37, 38 and resistor 39 constitute an AND circuit.

The output of the sample gate 28 is connected along line 44 to a servo motor 45. As previously stated, the servo motor 45 is connected to and drives the capstans utilized to move the length of film to be positioned. The servo motor 45 and capstans will hereinafter be referred to as servo drive. The particular configuration of the servo motor 45 is no part of the subject invention and many conventional types of servo motors will suffice. The only criterion is that the control circuitry of the servo motor, when presented with an error signal including a magnitude portion indicative of direction of error and an amplitude portion indicative of amount of error, will rotate the associated capstan in a direction and amount to null the error.

Figure 4:
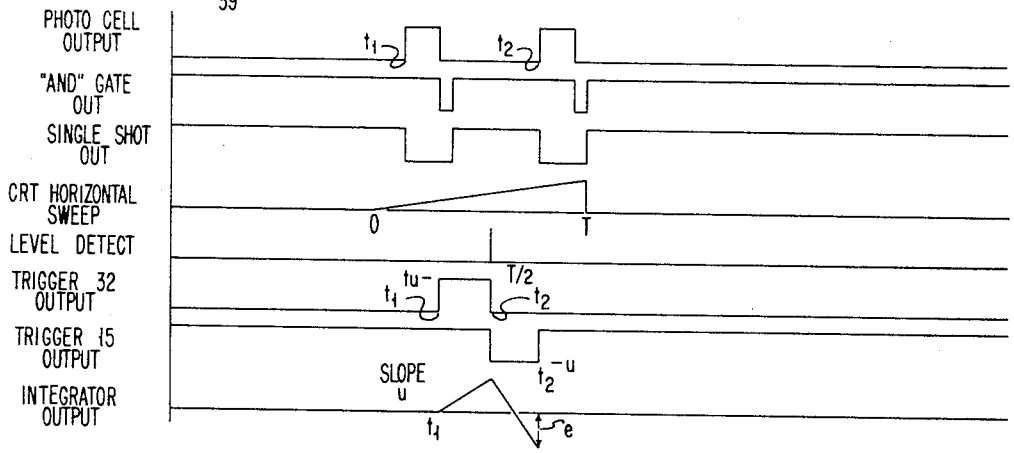
FIG. 4 is a chart of wave forms showing the wave forms associated with the various components of the control system of FIG. 3.

For an operational description of the circuit of FIG. 3, refer next to FIG. 4 wherein is shown wave forms illustrative of the timing and outputs of the various components of FIG. 3.

As shown in FIG. 4, the cathode ray tube horizontal sweep is generated by a sawtooth signal going from times 0—$T$. Since the face of the cathode ray tube is one of the reference points for the subject positioning system, a pulse is required at the midpoint timewise of the horizontal sweep. As shown in FIG. 3, there is provided a level detector 19 which is set such that it provides an output along line 18 when the sawtooth of the cathode ray tube horizontal sweep achieves a voltage equal to one-half of its amplitude swing. Any type of level detector can be utilized. For example, one type which works admirably is shown and described in an article entitled "Predetermined Input Level Cuts Off Transistor, Sets Output," by Robert W. Allington, in Electronic Design, 100 Ideas for Design, No. 2 (Hayden Book Co., Inc., New York, New York), p. 14, 1962. In this particular circuit, there is a positive output provided when the input and reference pulses are equal, while at all other times the output is zero. The midpoint pulse from the level detector 19 which appears on line 18 is shown in FIG. 4 as a narrow positive pulse. This pulse appears at the precise center of the cathode ray tube horizontal sweep and the film can therefore be positioned relative to this pulse.

As previously stated, a desired frame is positioned by means, which are not part of the subject invention, into approximate alignment with the optical station and the center of the cathode ray tube which will be referred to as the optical axis. As illustrated in FIG. 4, when the cathode ray tube spot sweeps across the selected frame, two voltage pulses are generated as indicated by the photocell output as the beam sweeps across the opaque border of the selected frame. These pulses in FIG. 4 are labelled photocell output. The positive going edge of the first photocell output is fed along line 35 into the input of the single shot 36. This single shot, as shown in the wave form illustrated single shot out, turns on and produces a negative pulse which is wider than the pulse produced by the photocell output due to the crossing by the cathode ray tube beam over the border of the frame 2. When the transition by the cathode ray tube beam across the border has been completed, the photocell output falls and at this time both the photomultiplier output and the single shot output are negative and thus the AND gate attached to the set terminal or trigger 32 is true thereby providing a set pulse to trigger 32. As shown in the wave form labelled trigger 32 output, the output of trigger 32 goes positive at the time that the photocell ouput falls from a positive value to a zero value. This trigger 32 output rises at time $t_1$ and remains there until the level detector 19 provides a pulse along lines 18 and 31 to the reset terminal of trigger 32 at which time the output pulse provided along line 34 falls to a zero value.

The output pulse furnished by the level detector 19 along line 18 also is fed along line 17 to the set terminal of trigger 15. As shown in the wave form labelled trigger 15 output, setting of trigger 15 causes its output taken along line 20 to fall to a negative value. The output of trigger 15 remains at this negative value until time $t_2$, which is the time of occurrence of the positive going edge of the second photomultiplier pulse produced as the photomultiplier crosses the second opaque border of the frame 2. Thus, as indicated, the photomultiplier pulse is applied along line 16 to the reset terminal of trigger 15 to cause the output taken along line 20 to again fall to a zero value.

The output from triggers 15 and 32, which, as indicated in FIG. 3, are negative and positive, respectively, are fed into the integrator 23 which may be a conventional capacitor type integrator. The contents of the integrator are shown at FIG. 4 by the wave form labelled integrator output. As shown in this wave form at time $t_1$, the value in the integrator begins to rise by virtue of the output of trigger 32 and continues to rise until the time that trigger 32 is turned off. At the time of turning trigger 32 off, of course, as previously described, trigger 15 turns on, but its output, as previously discussed, is negative. Trigger 15, of course, stays off until the second photomultiplier output occurs. Thus, as is obvious, the duration of the trigger outputs vary in accordance with the time between the falling of the trailing edge of the first photomultiplier output and the rising of the leading edge of the second photomultiplier output which is caused by positional error. Thus, as indicated in FIG. 4, if the time differential between the falling edge of the first photomultiplier output to the level detect output pulse was equal to the time between the level detect output pulse and the rising edge of the second photomultiplier output, the outputs of triggers 15 and 32 would be equal in both time and amplitude such that the integrator output would be zero. However, for illustrational purposes, in FIG. 4 the times between the falling edge of the first photomultiplier pulse and the level detect pulse and the level detect pulse and the rising edge of the second photomultiplier pulse has been made unequal such that the duration of time between the occurrence of the level detect pulse and the rising edge of the second photomultiplier pulse is greater. Therefore, the duration of the pulse from trigger 15 is greater than the duration of the pulse from trigger 32. Therefore, since the output of the trigger 15 is negative, the value in the integrator 23 passes through zero and is negative with respect to the zero reference line. As shown in FIG. 4, this value $e$ is indicative both of direction of positional error and amount. It is this signal that is then fed into the control circuitry of the associated servo motor 45 which is to be nulled.

In summary, a selected frame on a length of non-sprocketed microfilm is moved into approximate alignment with an optical station. The two edges of the border 3 are swept by a cathode ray tube spot. A photomultiplier 14 converts the modulated light from the border 3 into a voltage. A pulse is generated at the midpoint of the horizontal sweep of the cathode ray tube 6. The falling edge of the initial photomultiplier output is used to set a trigger 32 to a plus state. The trigger 32 is reset by a pulse at the center of the CRT horizontal sweep. This center pulse also sets another trigger 15 to a minus state of equal amplitude and this trigger 15 is reset by the leading edge of the second photomultiplier output. Both trigger outputs are fed into an integrating circuit 23. The value of the integral is representative of positional error with respect to the center of the cathode ray tube 6. An associated servo motor is then operated to null this error.

In the above described manner there has been provided a novel microfilm indexing system for use in indexing non-sprocketed microfilm which is capable of utilization in indexing both Mil and non-Mil D type non-sprocketed microfilm. Likewise, there has been provided a microfilm indexing system for use in a non-sprocketed microfilm environment where positioning accuracies are determined not by the rotational position of the driving member such as the capstan, but by reference to the frames of the microfilm itself such that slippage between the capstan and the film does not impair positional accuracies.

It will, of course, be obvious to those skilled in the art that while a cathode ray tube is utilized as a light source, an oscillating mirror could be utilized to sweep a spot of light over the selected frame in which case the mechanical center of the oscillation would replace the level detect pulse as the midpoint reference.

While the invention has been particularly shown and described with reference to a preferred embodiment thereof, it will be understood by those skilled in the art that various changes in the form and details may be made therein without departing from the spirit and scope of the invention.

What is claimed is:

1. A system wherein a selected frame on a length of transparent microfilm is brought into approximate alignment with an optical axis by means of a servo drive, each of the frames on said microfilm including an opaque border, said system comprising:
   means for scanning said opaque border of said selected frame to produce an electric signal indicative of the position of said opaque border with reference to said optical aixs, and
   means for gating said electric signal to said servo drive.

2. A system wherein a selected frame on a length of transparent microfilm is brought into approximate alignment with an optical axis by means of a servo drive, each of the frames on said microfilm including an opaque border, said system comprising:
   means for repetitively scanning said opaque border of said selected frame to produce during each scan an elecrtic signal indicative of the amount of and direction of deviation of the midpoint of said frame from said optical axis, and
   means for gating said electrical signal to said servo drive at the completion of each scan.

3. A system wherein a selected frame on a length of transparent microfilm is brought into approximate alignment with an optical axis by means of a servo drive, each of the frames on said microfilm including an opaque border, said system comprising:
   means for scanning a spot of light over said opaque border of said selected frame,
   means for detecting the modulation of said spot of light by said opaque border and generating a first signal indicative of said modulation,
   means for generating a second signal at the time that said spot of light falls on said optical axis,
   means connected to said detecting and generating means and responsive to said first and second signals for generating an electrical integral during each scan indicative of the magnitude and direction of the deviation of the center of the light spot scan from the midpoint of said opaque border, and
   means for gating said electrical integral to said servo drive at the completion of each scan.

4. The system of claim 3 wherein said means for scanning a spot of light comprises a cathode ray tube and said means for generating a second signal comprises a level detecting means receptive of the sawtooth horizontal swep signal of said cathode ray tube.

5. A system wherein a selected frame on a length of transparent microfilm is brought into approximate alignment with an optical axis by means of a servo drive, each of the frames on said microfilm including an opaque border, said system comprising:
   means for repetitively scanning a spot of light over said opaque border of said selected frame,
   means for detecting the modulation of said spot of light by said opaque border and generating a first signal and a second signal during the transition of said border by said spot of light,
   means for generating a pulse at a time corresponding to the midpoint of the scan of said spot of light,
   first and second trigers connected to said detecting means,
   means,
   said first trigger being set by said first signal from detecting means and reset by the midpoint pulse, said second trigger being set by the midpoint pulse and being reset by said second pulse from said detecting means, the output of said triggers being opposite in sign, an integrator connected to outputs of both said first and second triggers, and means for gating the contents of said integrator to said servo drive at the completion of each scan.

6. The system of claim 5 wherein said means for generating the midpoint pulse comprises a level detector receptive of the sawtooth horizontal cathode ray tube sweep signal.

References Cited

UNITED STATES PATENTS

| | | | |
|---|---|---|---|
| 3,229,100 | 1/1966 | Greanias | 250—202 |
| 3,342,978 | 9/1967 | Cameron et al. | 178—6.6 X |
| 3,350,505 | 10/1967 | Bakis | 250—217 X |

RICHARD A. FARLEY, *Primary Examiner.*

J. P. MORRIS, *Assistant Examiner.*